United States Patent
Natal et al.

(10) Patent No.: US 11,233,743 B2
(45) Date of Patent: Jan. 25, 2022

(54) EXTENDING ENTERPRISE TRUSTED POLICY FRAMEWORK TO CLOUD NATIVE APPLICATIONS

(71) Applicant: Cisco Technology, Inc., San Jose, CA (US)

(72) Inventors: Alberto Rodriguez Natal, Mountain View, CA (US); Fabio Maino, Palo Alto, CA (US); Bradford Pielech, Waltham, MA (US); Richard James Smith, Detroit, MI (US); Mikhail Davidov, Seattle, WA (US); Lorand Jakab, Gheorghieni (RO)

(73) Assignee: CISCO TECHNOLOGY, INC., San Jose, CA (US)

( * ) Notice: Subject to any disclaimer, the term of this patent is extended or adjusted under 35 U.S.C. 154(b) by 67 days.

(21) Appl. No.: 16/839,485

(22) Filed: Apr. 3, 2020

(65) Prior Publication Data

US 2020/0322273 A1   Oct. 8, 2020

Related U.S. Application Data

(60) Provisional application No. 62/829,016, filed on Apr. 3, 2019.

(51) Int. Cl.
*H04L 12/46* (2006.01)
*H04L 12/851* (2013.01)
(Continued)

(52) U.S. Cl.
CPC ...... *H04L 47/2425* (2013.01); *H04L 12/4641* (2013.01); *H04L 61/2503* (2013.01);
(Continued)

(58) Field of Classification Search
CPC ......... H04L 12/00; H04L 12/28; H04L 12/46; H04L 12/4641–4675; H04L 41/00; H04L 41/08; H04L 41/12; H04L 47/00; H04L 47/10; H04L 47/24; H04L 47/2425–2441; H04L 61/00; H04L 61/25; H04L 61/2503;
(Continued)

(56) References Cited

U.S. PATENT DOCUMENTS

| 7,688,829 B2 * | 3/2010 | Guichard | ................ H04L 45/66 370/395.31 |
|---|---|---|---|
| 10,171,507 B2 | 1/2019 | Jain et al. | |

(Continued)

OTHER PUBLICATIONS

Kosaka, "Container Segmentation Strategies and Patterns", Neuvector (Year: 2019).*

(Continued)

*Primary Examiner* — Boris D Grijalva Lobos
(74) *Attorney, Agent, or Firm* — Polsinelli PC

(57) ABSTRACT

The present technology pertains to a system and method for extending enterprise networks' trusted policy frameworks to cloud-native applications. The present technology comprises sending, by an enterprise network controller, a first communication to a service mesh orchestrator for a service mesh, wherein the first communication informs the service mesh orchestrator of traffic segmentation policies to be applied to traffic originating at an enterprise network and of layer 7 extension headers which correspond to the enterprise network traffic segmentation policies.

18 Claims, 6 Drawing Sheets

(51) Int. Cl.
*H04L 29/12* (2006.01)
*H04L 29/06* (2006.01)

(52) U.S. Cl.
CPC ............ *H04L 69/166* (2013.01); *H04L 69/22* (2013.01); *H04L 2212/00* (2013.01)

(58) Field of Classification Search
CPC ....... H04L 69/00; H04L 69/16; H04L 69/166; H04L 69/22
See application file for complete search history.

(56) References Cited

U.S. PATENT DOCUMENTS

| | | | | |
|---|---|---|---|---|
| 2007/0094394 A1* | 4/2007 | Singh | ................... | H04L 69/161 709/226 |
| 2019/0372850 A1* | 12/2019 | Fandli | ................. | H04L 41/0893 |
| 2020/0076769 A1* | 3/2020 | Mishra | ................ | H04L 63/0218 |

OTHER PUBLICATIONS

Andress, "Network Segmentation—an overview", Sciencedirect (Year: 2017).*
International Search Report and Written Opinion from the International Searching Authority, dated Jun. 9, 2020, 13 pages, for corresponding International Patent Application No. PCT/US2020/026748.
Smith, M., et al., "Scalable-Group Tag eXchange Protocol (SXP)," draft-smith-kandula-sxp-06, Jun. 1, 2017, pp. 1-56.

* cited by examiner

EXTENDING ENTERPRISE TRUSTED POLICY FRAMEWORK TO CLOUD NATIVE APPLICATIONS

CROSS-REFERENCE TO RELATED APPLICATIONS

This application claims priority to U.S. Provisional Application No. 62/829,016, filed on Apr. 3, 2019, the contents of which are incorporated herein by reference in its entirety.

TECHNICAL FIELD

The present technology pertains to extending an enterprise's trusted policy framework to cloud native applications, and more specifically to extending enterprise traffic segmentation rules to a service mesh.

BACKGROUND

Enterprises commonly utilize applications that extend into the cloud. In some instances these application are made up of a collection of microservices that are tied together in what is sometimes called a service mesh. The concept of a service mesh offers networking and monitoring for highly decomposed and distributed applications by offloading common functionality (e.g. load balancing, circuit breaking, encryption, etc.) out of the applications and into a shared framework.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
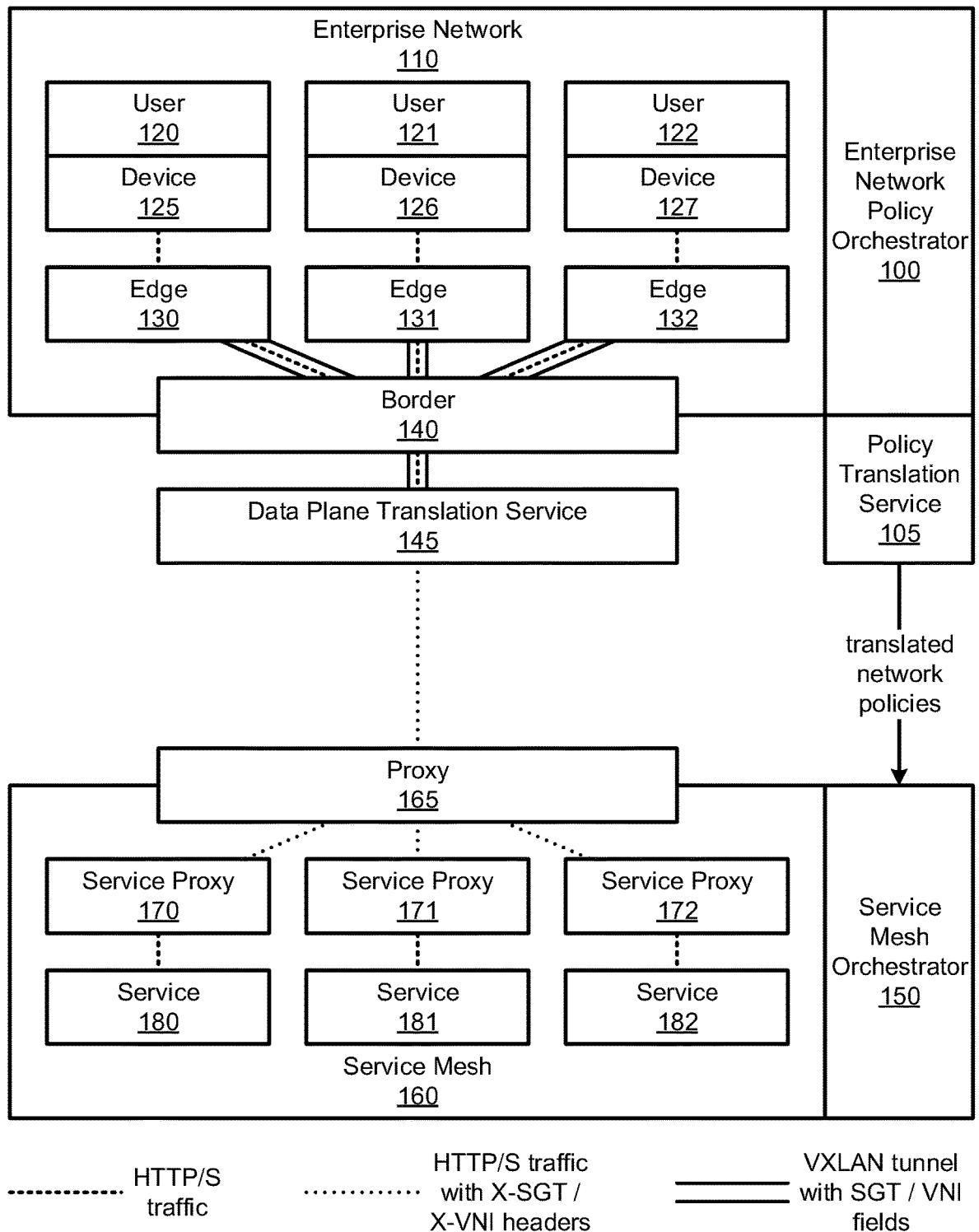
FIG. 1 illustrates an example enterprise network and cloud based service mesh in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present technology concerns extending policy frameworks from native enterprise networks into cloud-based service mesh frameworks. The technology details means for sending, from an enterprise network controller, a first communication to a service mesh orchestrator which informs the service mesh orchestrator of traffic segmentation policies. These policies can then be applied to traffic originating within the enterprise network via layer 7 extension headers which correspond to the traffic segmentation policies.

Example Embodiments

Various embodiments of the subject technology relate to integrating enterprise policies into service meshes. The present technology overcomes challenges when communicating at the transition from a boundary of an enterprise network to a boundary of a cloud-based service mesh of intercommunicating micro services.

The present technology recognizes the need to control how services within a service mesh communicate with each other and with the outside world. As deployed today, the policies defined for service meshes are decoupled from the policies defined for the enterprise users, devices, and workloads. The present technology remedies these problems by providing mechanisms to extend enterprise policy and segmentation semantics into the service mesh.

The need for such technology is becoming particularly important in the light of the need to preserve trust across domains, especially when they span out of the enterprise controlled network. The ability to render an enterprise trust policy to the cloud is one important use of the present technology.

The present technology offers solutions to integrate an enterprise policy into a service mesh under two different deployment models, depending if the policy translation on the data-plane happens inside or outside the enterprise network. The technology translates policies and context used to express and enforce policies in the enterprise to the service mesh. This can be achieved, in part, by interfacing an Enterprise (EN) Policy Orchestrator with a Service Mesh Orchestrator and by translating context from one domain (enterprise to service mesh and vice versa) to the other to enable a uniform end-to-end policy that can be enforced across the enterprise and the cloud-based service mesh. Orchestrator policies can be complemented by data plane policy information as well, such as by adding X-SGT or X-VNI tags to HTTP traffic.

FIG. 1 illustrates an embodiment of the present technology wherein the translation of the data-plane metadata happens outside the enterprise network. In this embodiment (as in the embodiments shown in FIGS. 2A and 2B), the enterprise decides to use available service mesh implementations without any modification and/or to leverage the offerings of third parties that provide a Container-as-a-Service (CaaS) infrastructure. In such scenarios, the enterprise has no control over the service mesh infrastructure and can only interact with it via the well-defined APIs of the service mesh orchestrator. In such cases, it is not possible to bring the enterprise data-plane into the service mesh as the service mesh proxies are not able to process the enterprise specific data-plane.

An enterprise network routes and restricts access by users or devices according to a set of policies that govern the network. At times, enterprise network users or devices will need to make use of outside networks in order to access a service, send a communication, or complete another necessary task. In these cases, the enterprise can have a vested interest in ensuring that its network-governing policies are enforced outside of the enterprise network.

To allow policy-enforcement on a third party service mesh, the system can supplement data-plane traffic with policy tags encoded at application layer 7 and can translate control-plane policies from the enterprise network to make them accessible to the service mesh. An example of an orchestration system that could use these translated policies is ISTIO.

As illustrated in FIG. 1, an enterprise network 110 includes user devices 120, 121, and 122 and a border gateway router 140. Each user device 120, 121, and 122 connects through an edge node 130, 131, and 132 before traffic can move to border 140. The enterprise network policies are set by an enterprise policy orchestrator 100 such as, for example, CISCO DNA CENTER.

The service mesh 160 includes a plurality of software services 180, 181, and 182 (micro services) for performing functions of a cloud hosted application. Service mesh 160 further contains a service mesh orchestrator 150 along with general proxy 165 and service proxies 170, 171, and 172. In some embodiments, the service proxies 170, 171, and 172 can be Envoy proxies on an ISTIO control plane.

The enterprise policy orchestrator 100 can translate, via policy translation service 105, enterprise policies into primitives understood and utilized by service mesh orchestrator 150. In the current embodiment, enterprise network 110 applies policies based on the identities and credentials of users 120, 121, and 122 or their devices 125, 126, and 127. However, to make these policies actionable by service mesh 160, policies on users or devices (layers 2 or 3) need to be translated to policies on services (layer 7). For instance, the policy translation may result in expressing that HTTP/S traffic carrying a certain X-SGT tag value cannot access a particular service 180 in the service mesh 160. This policy translation needs also to consider that the returning traffic from the service mesh 160 needs to be properly tagged with the enterprise semantics (e.g. adding X-SGT and X-VNI tags to the HTTP traffic). The policy translation has to include the proper configuration for the service mesh orchestrator 150 to ensure that these tags are correctly applied. This is needed to translate back the native service mesh traffic to enterprise encapsulated traffic in the data-plane translation component.

The data plane translation service 145 can be a data-plane component capable of converting back and forth between enterprise-encapsulated data-plane traffic (e.g. VXLAN-GPO) and native service mesh traffic (e.g. HTTP/S). A possible instantiation of this component is in the form of a data plane translation service 145 that accepts enterprise-encapsulated traffic, extracts the enterprise tagging (e.g. VNI and SGT fields carried in the VXLAN-GPO header) and then injects enterprise-specific tags in the original HTTP/S headers of the packet (e.g. X-SGT and X-VNI extension tags). If the traffic is HTTP/S, in order to inject the HTTP/S tags, the data plane translation service 145 will also terminate the transport layer security (TLS) connection from the enterprise 110 and create a new TLS connection towards the service mesh 160. The reverse path from the service mesh 160 to the enterprise 110 is analogous via this data-plane component.

In tandem, the control-plane policy translation coupled with the data-plane traffic conversion allows enterprise policies on layer 2 or 3 entities (users or devices) to be applied to layer 7 entities (services) in service mesh 160. In some embodiments, policy translation service 105 can be a third-party service or can be attached to enterprise network policy orchestrator 100. In some embodiments, data plane translation service 145 can be a third-party service or can be attached to border 140.

Thus, in FIG. 1 the enterprise policy orchestrator 100 can translate enterprise polices into primitives that can be understood and acted upon by the service mesh 160. The data plane translation service 145 serves to translate data plan traffic encapsulation into HTTP traffic so that it can be understood by the service mesh 160 (or the reverse translating HTTP traffic into properly encapsulated data plan traffic going back into the enterprise network 110). This translation leverages the data-plane transformation that happened between the enterprise encapsulation and the native service mesh traffic.

Figure 2A:
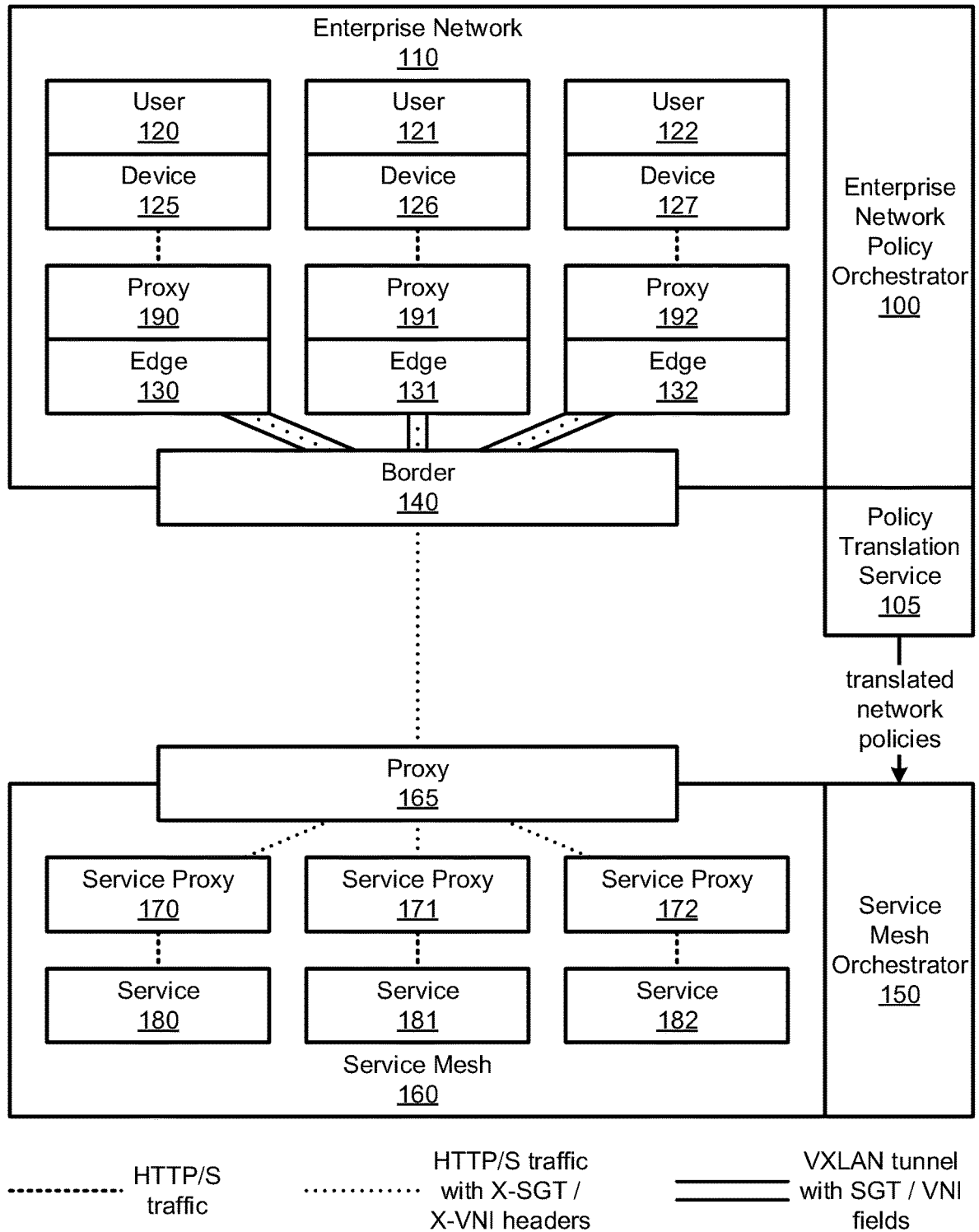
FIGS. 2A and 2B illustrate an example enterprise network and cloud based service mesh in accordance with various embodiments.
Figure 2B:
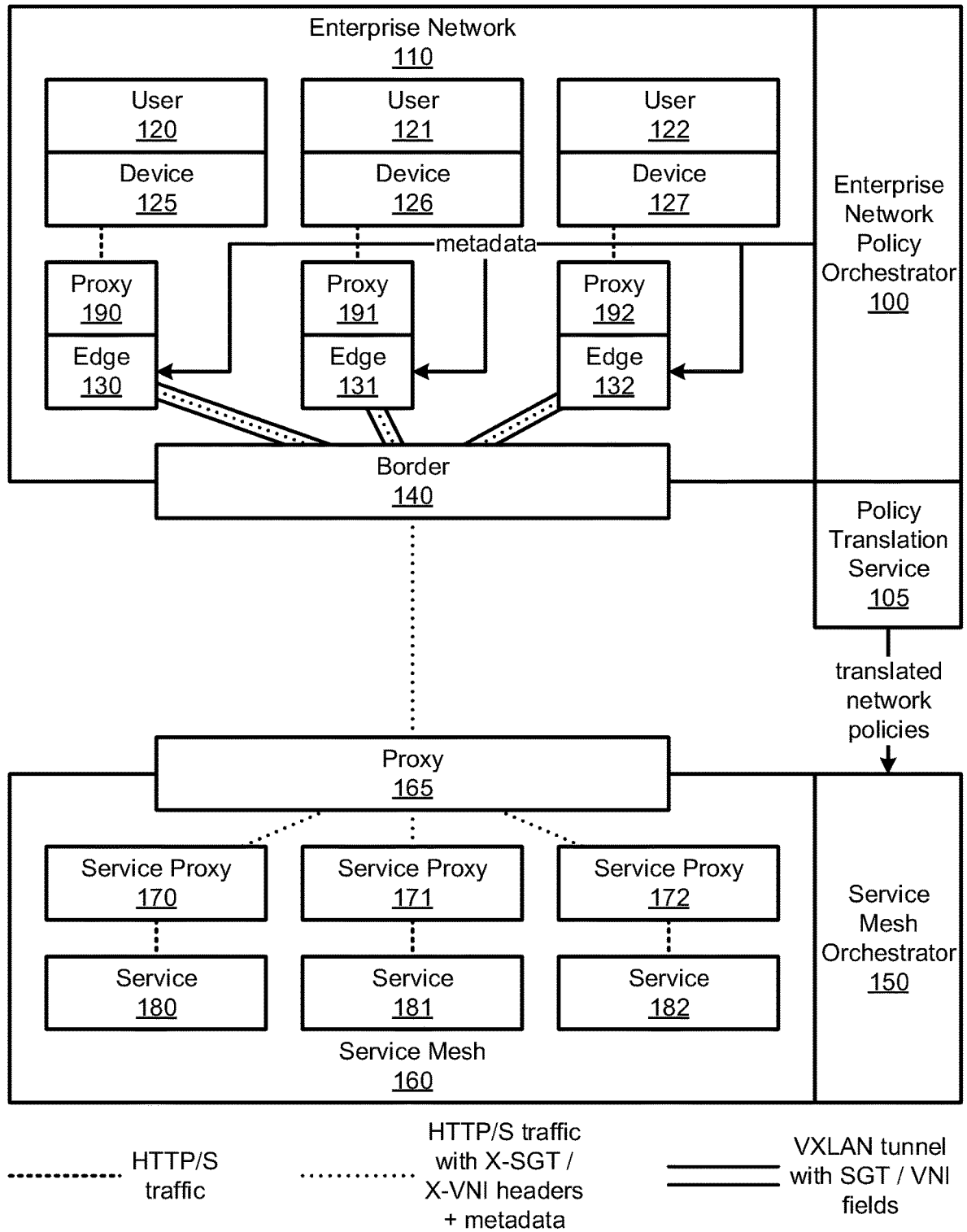

FIGS. 2A and 2B illustrate an embodiment of the present technology where translation of the policies in the data-plane happens within the enterprise network. In this embodiment, a proxy is used at edges in the enterprise network which encapsulate enterprise traffic with HTTP/S tags.

Enterprise network policy orchestrator 100 instills a proxy 190, 191, or 192 at each edge node 130, 131, and 132 to convert back and forth between enterprise-encapsulated HTTP/S traffic and native service mesh HTTP/S traffic. A possible instantiation of these proxies in enterprise network 110 is in the form of injecting enterprise-specific tags in the original HTTP/S headers of the packet (e.g. X-SGT, and X-VNI extension tags and forgoing the middle step of enterprise-encapsulated data-plane traffic (e.g. VXLAN-GPO) with SGT/VNI fields entirely. The reverse path from the service mesh 160 to the enterprise 110 is analogous. This embodiment does not require a data plane translation service 145 at border 140 or elsewhere in the system.

FIG. 2B adds enterprise metadata to the traffic at each edge node 130, 131, and 132. Metadata encapsulated in the traffic at edges 130, 131, and 132 can give further context to the traffic and allow for more nuanced policy applications. This metadata encapsulation is possible because the data-plane translation is occurring at an edge in enterprise network 110. Metadata can include specific information about any of users 120, 121, and 122 or devices 125, 126, or 127 (employment context, past device behavior, security clearance, etc.), general activity on enterprise network 110, or other relevant activity for policy application.

Figure 3:
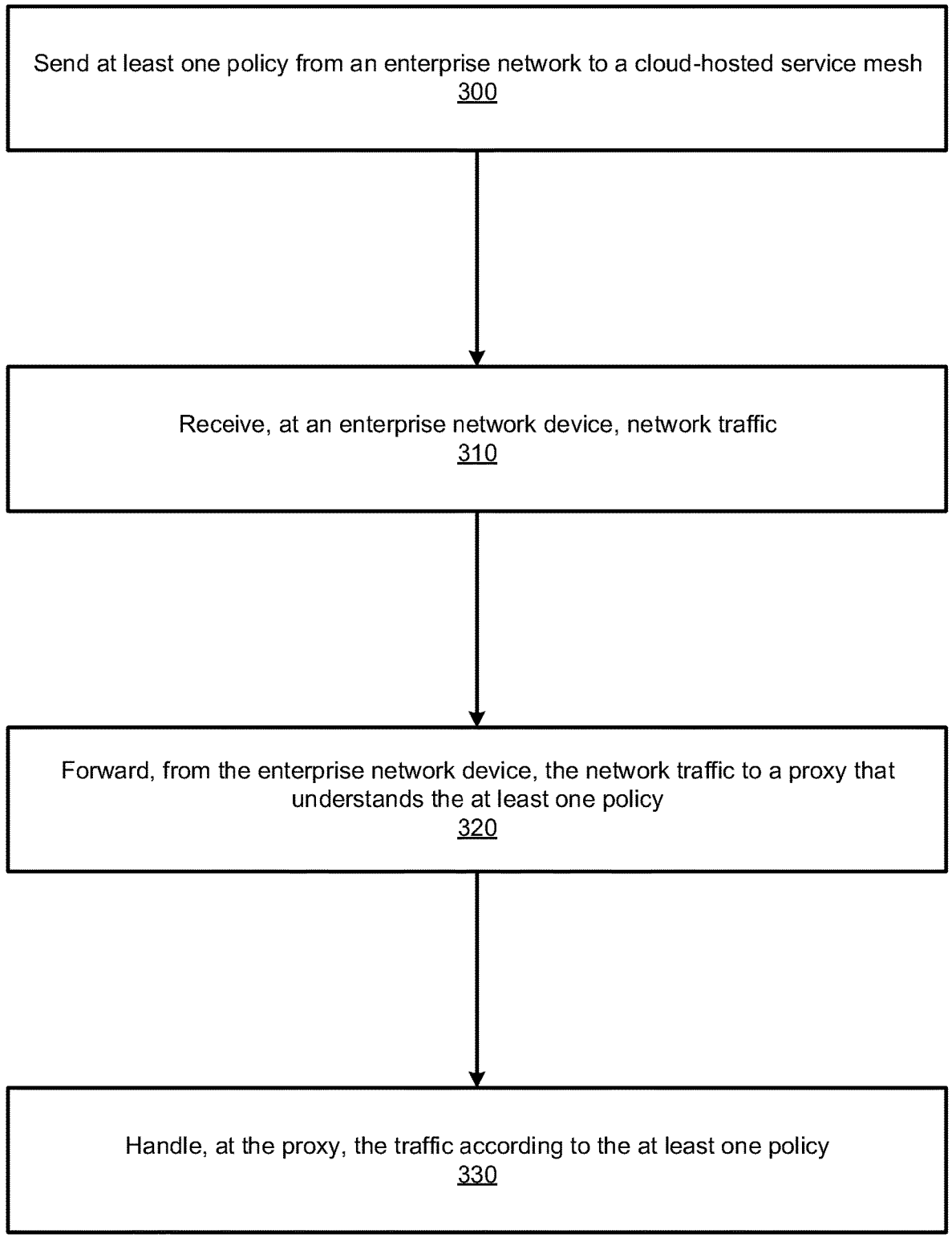
FIG. 3 illustrates an example method in accordance with various embodiments.

FIG. 3 illustrates an example method in accordance with various embodiments.

The method begins when enterprise network policy orchestrator 100 in enterprise network 110 sends (300) at least one policy to service mesh orchestrator 150 on service mesh 160. These policies are passed through policy translation service 105 before reaching service mesh orchestrator 150 on service mesh 160. The translation takes enterprise-specific policies and converts them to a public API which can be understood and executed by service mesh 160.

On service mesh 160, service mesh orchestrator 150 takes the received policies and orchestrates them amongst proxy 165 and service proxies 170, 171, and 172. It sets up the proxies to understand tags embedded in traffic coming from enterprise network 110, such as X-SGT and X-VNI tags, and apply policies in accordance with the policies of enterprise network 110.

After policies have been communicated from the enterprise to the service mesh, edge nodes 130, 131, and 132 receive (310) traffic from devices 125, 126, and 127 on enterprise network 110. In the systems described in FIGS. 1, 2A, and 2B, this traffic is HTTP/S traffic, but other network traffic can also be received and handled by edge nodes 130, 131, and 132.

Edge nodes 130, 131, and 132 proceed to forward (320) the network traffic to a proxy 165 (and/or service proxies 170, 171, or 172) that understands the at least one policy previously communicated by enterprise network policy orchestrator 100. In various embodiments, this forwarding process can play out in different ways.

Traffic can be passed to a native enterprise border 140 with an accompanying data plane translation service 145 (embodiment illustrated in FIG. 1). In this embodiment, edge nodes 130, 131, and 132 forward traffic along a VXLAN and populates SGT or VNI fields with appropriate policy designations. Data plane translation service 145 takes the SGT/VNI fields and encapsulates the HTTP/S traffic X-SGT/X-VNI tags for consumption by proxy 165 (and/or service proxies 170, 171, or 172).

In other embodiments, the traffic can be handled by a proxy instilled in edges 130, 131, or 132 by enterprise network policy 100 (embodiment illustrated in FIGS. 2A and 2B). In this embodiment, traffic is immediately populated with HTTP/S tags (X-SGT or X-VNI tags) and may not be passed along VXLAN with SGT/VNI field population.

Proxy 165 handles (330) the incoming traffic according to any policies received by the service mesh. This handling can be influenced by information encapsulated in the data by the enterprise in accordance with policies, or, in some embodiments, by metadata added to the traffic (illustrated in FIG. 2B). The proxy will route traffic through service proxies 170, 171, or 172 to reach the appropriate service 180, 181, or 182, with the appropriate restrictions applied.

To fulfill the service request, service mesh 160, service mesh orchestrator 150, and service proxies 170, 171, and 172 act in tandem to allow services 180, 181, and 182 to fulfill all, part, or none of the service request. Data is received from services 180, 181, and 182 at service proxies 170, 171, and 172, respectively, and this traffic has the X-SGT/X-VNI headers from the service request reinstated. The response moves back through the system undergoing reverse translations and conversions at the same entities along which the service request experienced translations and conversions.

Figure 4:
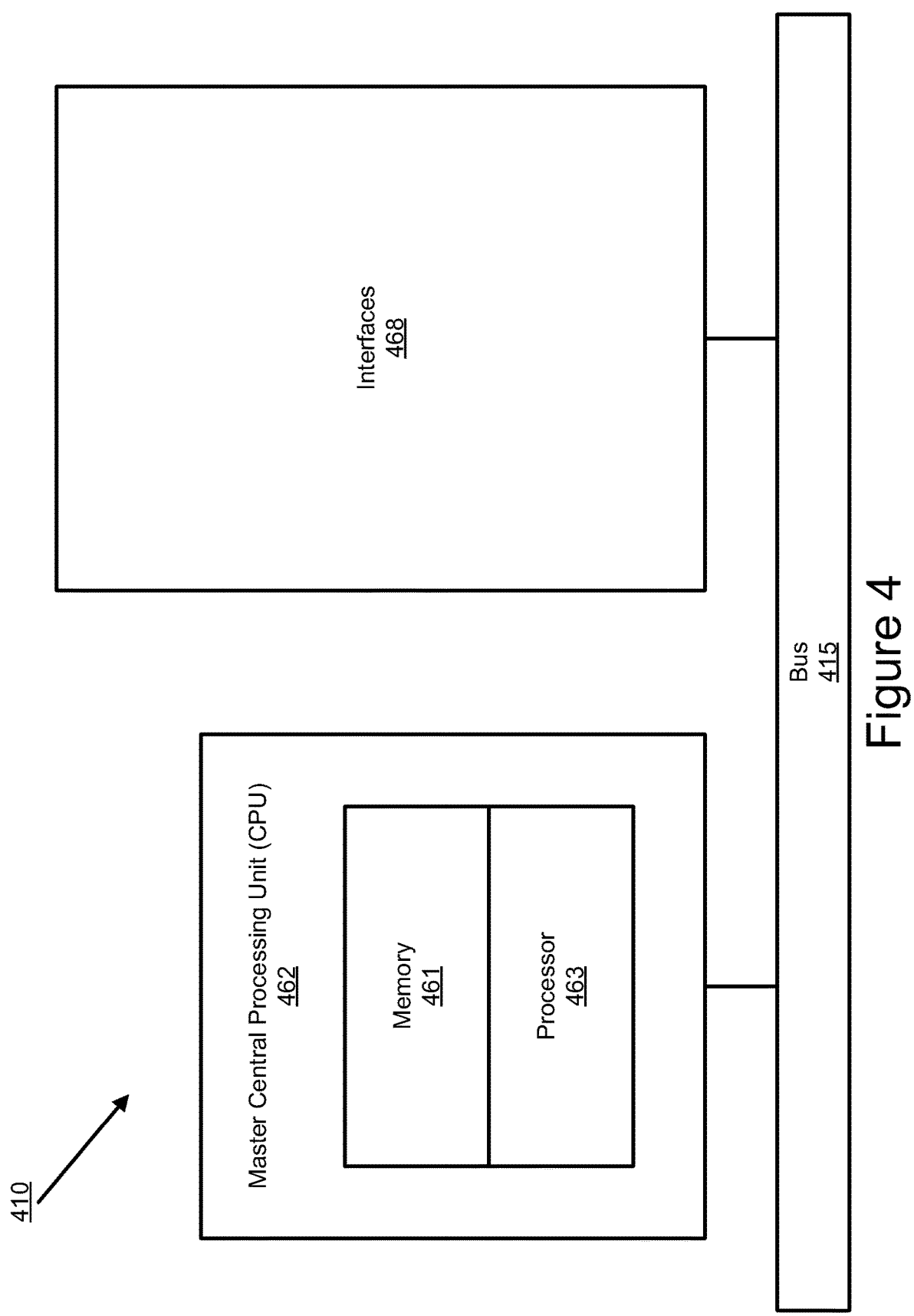
FIG. 4 illustrates an example network device in accordance with various embodiments.

FIG. 4 illustrates an exemplary network device 410 suitable for implementing the present invention. It can be a portion of any the devices included in FIG. 1, 2A, or 2B that can send or receive data over a network. Network device 410 includes a master central processing unit (CPU) 462, interfaces 468, and a bus 415 (e.g., a PCI bus). It preferably accomplishes its functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5:
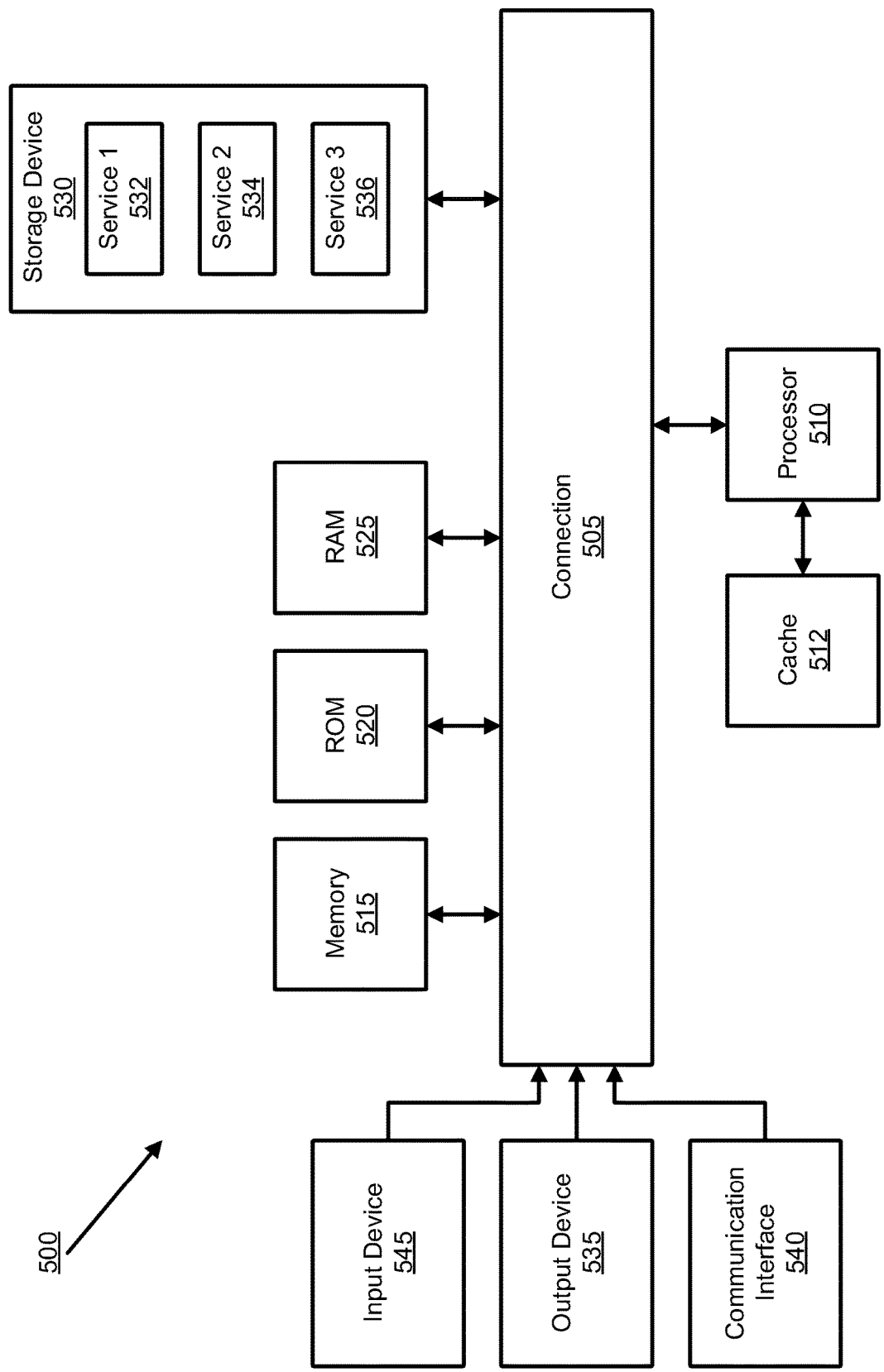
FIG. 5 illustrates an example computing device in accordance with various embodiments.

FIG. 5 shows an example of computing system 500, which can be for example any computing device illustrated in FIG. 1, 2A, or 2B or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. At least one non-transitory computer readable medium comprising instructions stored thereon, the instructions being effective to cause at least one processor to:
   receive, by a service mesh orchestrator for a service mesh from an enterprise network controller, a first communication, wherein the first communication informs the service mesh orchestrator of traffic segmentation policies to be applied to traffic originating at an enterprise network and of layer 7 extension headers which correspond to the traffic segmentation policies; and
   apply, by the service mesh orchestrator, the traffic segmentation polices on the service mesh; and
   handle network traffic, from the enterprise network at the service mesh, in accordance with the traffic segmentation polices.

2. The at least one non-transitory computer readable medium of claim 1, further comprising instructions effective to cause the at least one processor to:
   send, by the enterprise network controller, a second communication to a data plane translation service, wherein the second communication instructs the data plane translation service to translate layer 2 or 3 fields for network traffic destined for the service mesh into the layer 7 extension headers prior to forwarding the network traffic to the service mesh.

3. The at least one non-transitory computer readable medium of claim 2, wherein the layer 2 or 3 fields include an SGT field and a VNI field, which are translated into extension headers for HTTP(S) network traffic.

4. The at least one non-transitory computer readable medium of claim 1, further comprising instructions effective to cause the at least one processor to:
   send, by the enterprise network controller, a second communication to an enterprise edge network device of the enterprise network, wherein the second communication instructs the enterprise edge network device to insert layer 7 extension headers for use in traffic segmentation into network traffic destined for the service mesh prior to encapsulating the network traffic into a VXLAN tunnel between the enterprise edge network device and an enterprise border network device of the enterprise network.

5. The at least one non-transitory computer readable medium of claim 4, wherein the second communication further instructs the enterprise edge network device to send metadata describing the network traffic, and wherein the first communication further instructs the service mesh of granular network policies to be applied to the network traffic based on the metadata.

6. The at least one non-transitory computer readable medium of claim 2, wherein the second communication further instructs the data plane translation service to:
   receive layer 7 network traffic from the service mesh;
   detect the layer 7 extension headers;
   encapsulate the network traffic into a VXLAN tunnel between an enterprise border network device of the enterprise network and the data plane translation service; and
   create the layer 2 or 3 fields based on the detected layer 7 extension headers.

7. A method comprising:
   receiving, by a service mesh orchestrator for a service mesh from an enterprise network controller, a first communication to, wherein the first communication informs the service mesh orchestrator of traffic segmentation policies to be applied to traffic originating at an enterprise network and of layer 7 extension headers which correspond to the traffic segmentation policies;
   applying, by the service mesh orchestrator, the traffic segmentation polices on the service mesh; and
   handling network traffic, from the enterprise network at the service mesh, in accordance with the traffic segmentation polices.

8. The method of claim 7, further comprising:
   sending, by the enterprise network controller, a second communication to a data plane translation service, wherein the second communication instructs the data plane translation service to translate layer 2 or 3 fields for network traffic destined for the service mesh into the layer 7 extension headers prior to forwarding the network traffic to the service mesh.

9. The method of claim 8, wherein the layer 2 or 3 fields include an SGT field and a VNI field, which are translated into extension headers for HTTP(S) network traffic.

10. The method of claim 7, further comprising:
    sending, by the enterprise network controller, a second communication to an enterprise edge network device of the enterprise network, wherein the second communication instructs the enterprise edge network device to insert layer 7 extension headers for use in traffic segmentation into network traffic destined for the service mesh prior to encapsulating the network traffic into a VXLAN tunnel between the enterprise edge network device and an enterprise border network device of the enterprise network.

11. The method of claim 10, wherein the second communication further instructs the enterprise edge network device to send metadata describing the network traffic, and wherein the first communication further instructs the service mesh of granular network policies to be applied to the network traffic based on the metadata.

12. The method of claim 8, wherein the second communication further instructs the data plane translation service to:
    receive layer 7 network traffic from the service mesh;
    detect the layer 7 extension headers;

encapsulate the network traffic into a VXLAN tunnel between an enterprise border network device of the enterprise network and the data plane translation service; and create the layer 2 or 3 fields based on the detected layer 7 extension headers.

13. A system comprising:
a service mesh orchestrator of a service mesh configured to receive, from an enterprise network controller of an enterprise network, a first communication informing a service mesh orchestrator of traffic segmentation policies to be applied to traffic originating at an enterprise network and of layer 7 extension headers which correspond to the traffic segmentation policies;
apply the traffic segmentation polices on the service mesh; and
handle network traffic, from the enterprise network at the service mesh, in accordance with the traffic segmentation polices.

14. The system of claim 13, wherein the enterprise network controller is further configured to send a second communication to a data plane translation service, wherein the second communication instructs the data plane translation service to translate layer 2 or 3 fields for network traffic destined for the service mesh into the layer 7 extension headers prior to forwarding the network traffic to the service mesh.

15. The system of claim 14, wherein the layer 2 or 3 fields include an SGT field and a VNI field, which are translated into extensions headers for HTTP(S) network traffic.

16. The system of claim 13, wherein the enterprise network controller is further configured to send a second communication to an enterprise edge network device of the enterprise network, wherein the second communication instructs the enterprise edge network device to insert layer 7 extension headers for use in traffic segmentation into network traffic destined for the service mesh prior to encapsulating the network traffic into a VXLAN tunnel between the enterprise edge network device and an enterprise border network device of the enterprise network.

17. The system of claim 16, wherein the second communication further instructs the enterprise edge network device to send metadata describing the network traffic, and wherein the first communication further instructs the service mesh of granular network policies to be applied to the network traffic based on the metadata.

18. The system of claim 14, wherein the second communication further instructs the data plane translation service to:
receive layer 7 network traffic from the service mesh;
detect the layer 7 extension headers;
encapsulate the network traffic into a VXLAN tunnel between an enterprise border network device of the enterprise network and the data plane translation service; and
create the layer 2 or 3 fields based on the detected layer 7 extension headers.

* * * * *